(12) United States Patent
Mamou et al.

(10) Patent No.: US 9,330,661 B2
(45) Date of Patent: *May 3, 2016

(54) ACCURACY IMPROVEMENT OF SPOKEN QUERIES TRANSCRIPTION USING CO-OCCURRENCE INFORMATION

(71) Applicant: Nuance Communications, Inc., Burlington, MA (US)

(72) Inventors: Jonathan Mamou, Jerusalem (IL); Abhinav Sethy, Chappaqua, NY (US); Bhuvana Ramabhadran, Mount Kisco, NY (US); Ron Hoory, Haifa (IL); Paul Joseph Vozila, Arlington, MA (US); Nathan Bodenstab, Winchester, OR (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,788

(22) Filed: Jan. 16, 2014

(65) Prior Publication Data
US 2014/0136197 A1    May 15, 2014

Related U.S. Application Data

(63) Continuation of application No. 13/194,972, filed on Jul. 31, 2011, now Pat. No. 8,650,031.

(51) Int. Cl.
*G10L 15/00* (2013.01)
*G10L 15/16* (2006.01)
(Continued)

(52) U.S. Cl.
CPC . *G10L 15/08* (2013.01); *G06F 7/00* (2013.01); *G06F 17/30* (2013.01); *G10L 15/265* (2013.01); *G10L 15/1815* (2013.01)

(58) Field of Classification Search
CPC ......... G10L 15/22; G10L 15/16; G10L 15/20; G10L 15/265; G10L 15/02; G10L 15/10; G10L 15/00; G10L 15/08; G10L 15/12; G10L 15/063; G10L 15/187; G10L 15/142; G10L 15/144; G10L 15/14; G10L 15/30; G10L 17/005; G10L 17/02; G10L 25/87; G10L 13/06; G10L 13/07; G10L 17/26; G10L 13/04; G10L 13/08; G10L 13/043; H05K 999/99; G09B 21/009
USPC ......................................... 704/231–257, 275
See application file for complete search history.

(56) References Cited

U.S. PATENT DOCUMENTS 5,500,920 A * 3/1996 Kupiec ........................ 704/270.1
7,415,406 B2 * 8/2008 Huang et al. ...................... 704/9
(Continued)

OTHER PUBLICATIONS

"Frequency and Co-occurrence Analysis", http://www.n31abs.com/pdf/rank-co-occur.pdf.

*Primary Examiner* — Paras D Shah
*Assistant Examiner* — Anne Thomas-Homescu
(74) *Attorney, Agent, or Firm* — Banner & Witcoff, Ltd.

(57) ABSTRACT

Techniques disclosed herein include systems and methods for voice-enabled searching. Techniques include a co-occurrence based approach to improve accuracy of the 1-best hypothesis for non-phrase voice queries, as well as for phrased voice queries. A co-occurrence model is used in addition to a statistical natural language model and acoustic model to recognize spoken queries, such as spoken queries for searching a search engine. Given an utterance and an associated list of automated speech recognition n-best hypotheses, the system rescores the different hypotheses using co-occurrence information. For each hypothesis, the system estimates a frequency of co-occurrence within web documents. Combined scores from a speech recognizer and a co-occurrence engine can be combined to select a best hypothesis with a lower word error rate.

24 Claims, 5 Drawing Sheets (51) Int. Cl.

| | | |
|---|---|---|
| *G10L 15/20* | (2006.01) | |
| *G10L 15/06* | (2013.01) | |
| *G10L 15/26* | (2006.01) | |
| *G10L 15/04* | (2013.01) | |
| *G10L 15/14* | (2006.01) | |
| *G10L 15/28* | (2013.01) | |
| *G10L 15/18* | (2013.01) | |
| *G10L 21/00* | (2013.01) | |
| *G10L 25/00* | (2013.01) | |
| *G10L 15/08* | (2006.01) | |
| *G06F 7/00* | (2006.01) | |
| *G06F 17/30* | (2006.01) | |

(56) References Cited

U.S. PATENT DOCUMENTS

| | | | |
|---|---|---|---|
| 7,451,155 | B2 | 11/2008 | Slackman et al. |
| 7,873,519 | B2 | 1/2011 | Bennett |
| 8,041,734 | B2 | 10/2011 | Mohajer et al. |
| 8,126,897 | B2 * | 2/2012 | Sznajder et al. ............ 707/742 |
| 8,200,847 | B2 | 6/2012 | LeBeau et al. |
| 8,504,584 | B1 | 8/2013 | Baker et al. |
| 8,515,752 | B1 | 8/2013 | Franz et al. |
| 8,515,985 | B1 | 8/2013 | Zhou |
| 2006/0173682 | A1 | 8/2006 | Manabe et al. |
| 2007/0011133 | A1 | 1/2007 | Chang |
| 2007/0038449 | A1 * | 2/2007 | Coifman ........................ 704/243 |
| 2007/0038450 | A1 | 2/2007 | Josifovski |
| 2007/0118376 | A1 * | 5/2007 | Mukerjee ............ G10L 15/063 704/245 |
| 2007/0156403 | A1 * | 7/2007 | Coifman ........................ 704/252 |
| 2007/0213982 | A1 * | 9/2007 | Xi et al. ........................ 704/243 |
| 2007/0271241 | A1 | 11/2007 | Morris et al. |
| 2008/0004877 | A1 | 1/2008 | Tian |
| 2008/0052078 | A1 | 2/2008 | Bennett |
| 2008/0077570 | A1 | 3/2008 | Tang et al. |
| 2008/0177544 | A1 * | 7/2008 | Gorin et al. .................. 704/254 |
| 2008/0249773 | A1 * | 10/2008 | Bejar et al. ................... 704/243 |
| 2008/0281806 | A1 | 11/2008 | Wang et al. |
| 2008/0294437 | A1 * | 11/2008 | Nakano et al. ................ 704/251 |
| 2008/0300881 | A1 * | 12/2008 | Kashima et al. .............. 704/257 |
| 2009/0030680 | A1 * | 1/2009 | Mamou ......................... 704/235 |
| 2009/0030894 | A1 | 1/2009 | Mamou et al. |
| 2009/0037175 | A1 | 2/2009 | Wang et al. |
| 2009/0048833 | A1 * | 2/2009 | Fritsch et al. ................ 704/235 |
| 2009/0055185 | A1 | 2/2009 | Nakade et al. |
| 2009/0055190 | A1 * | 2/2009 | Filev et al. .................... 704/270 |
| 2009/0099845 | A1 | 4/2009 | George |
| 2009/0150337 | A1 | 6/2009 | Seide et al. |
| 2009/0204390 | A1 * | 8/2009 | Yamamoto et al. .............. 704/8 |
| 2010/0145694 | A1 | 6/2010 | Ju et al. |
| 2011/0099012 | A1 * | 4/2011 | Williams ................ G10L 15/01 704/240 |
| 2011/0224982 | A1 * | 9/2011 | Acero ..................... G10L 15/08 704/236 |
| 2012/0022867 | A1 | 1/2012 | Ballinger et al. |
| 2012/0059814 | A1 | 3/2012 | Sejnoha et al. |
| 2012/0173574 | A1 | 7/2012 | Homma et al. |
| 2012/0226696 | A1 | 9/2012 | Thambiratnam et al. |
| 2012/0317098 | A1 | 12/2012 | Okato et al. |
| 2013/0018867 | A1 | 1/2013 | Regan et al. |
| 2013/0124495 | A1 | 5/2013 | Sejnoha et al. |

* cited by examiner

ACCURACY IMPROVEMENT OF SPOKEN QUERIES TRANSCRIPTION USING CO-OCCURRENCE INFORMATION

RELATED APPLICATIONS

This application is a continuation of pending U.S. Ser. No. 13/194,972, filed Jul. 31, 2011 entitled ACCURACY IMPROVEMENT OF SPOKEN QUERIES TRANSCRIPTION USING CO-OCCURRENCE INFORMATION, the teachings and contents of which are incorporated herein in their entirety.

BACKGROUND

The present disclosure relates to speech recognition. The present disclosure also relates to information retrieval systems for executing searches and, more specifically, for executing voice-enabled searches.

Mobile devices that have the ability to browse the Internet have rapidly grown in number. Such growth has opened up application areas for speech and natural language processing technologies. Voice search is one such application where speech technology is making a significant impact by enabling people to access the Internet conveniently from mobile devices. Spoken queries are a natural medium for searching the Mobile Web, especially in the common case where typing on a device keyboard is impractical or inconvenient. Voice search is now recognized as a core feature of many mobile devices, and several related applications have been developed.

Voice-enabled searching, also referred to as voice search, allows individuals to use a voice command or voice query to search the Internet and/or electronic devices. A voice search is a search executed using a spoken query or spoken utterance. Such voice searching typically involves a device or processor converting a spoken utterance into text, such as by converting spoken words, numbers and characters into a text string or textual representation of the spoken utterance. This text string can then be used to complete a search via an Internet search engine, database lookup, or other information retrieval system.

Voice searching can include local voice search or open voice search. Local voice searching typically involves executing a voice-enabled search within a specific domain. Restricting a voice search to a specific domain can result in search results that are very accurate by virtue of the narrowed search domain. For example, a local voice search can include searching a specific directory assistance service such as a residential telephone listing. Open voice searching permits open-domain keyword queries on any information available over a communication network. One example of an open-domain keyword search is searching an Internet search engine. Open voice searching has received increased interest from industry, academia, and individuals, because of the rapid expansion of Web and mobile technology. Voice searching can provide a quick and convenient search option, especially for users of wireless and mobile devices.

SUMMARY

Language modeling for voice search recognition has different challenges compared to more conventional speech applications. These challenges arise because spoken queries are usually a set of keywords and do not have a syntactic and grammatical structure. This is especially true with open voice searching due in part to a larger speech recognition space as compared to searching a specific domain. Generally, in conventional voice search applications, a spoken query is automatically recognized using an Automatic Speech Recognition (ASR) process or system. The ASR is also known as an Automatic Speech Recognizer (ASR), Decoder, or just Recognizer. The ASR typically yields a 1-best hypothesis that is sent to a text-based web search engine.

The conventional approach for voice query recognition involves building statistical n-gram language models from web documents as well as from web query logs. Such approach, however, suffers from low accuracy. Modeling the distribution of words in spoken queries offers different challenges compared to more conventional speech applications. The differences arise from voice search applications serving as a front-end to web search engines. Users typically provide a given search engine with keywords that will aid in retrieving desired information. Spoken web queries, however, especially keyword style queries, are typically short and do not follow typical syntax and grammar observed in other ASR tasks. In other words, such spoken queries are often not typical phrases. Another challenge is that a huge amount of textual web query logs would be required to build a complete language model for voice queries, and such a collection of textual query logs is generally not available. For example, large search engine operators will collect textual query logs, but will generally not sell or distribute such query logs.

Conventional approaches have applied rescoring to initial hypotheses, but such rescoring involves simply using a more complex model that would be slow to use on every possible sequence, but that can be used more effectively when limited to the n-best choices. More specifically, a typical example of this approach is that a spoken utterance is analyzed with a 3-gram model to identify a list of best choices, and then those best choices (as subset of choices generated from the 3-gram model) are subsequently analyzed using a 6-gram model. Thus, the 6-gram model is only applied during the rescoring on a subset and not during the initial decoding.

Techniques disclosed herein include systems and methods for open-domain voice-enabled searching. Techniques include a co-occurrence based approach to increase or improve accuracy of the 1-best hypothesis for non-phrase voice queries, as well as for phrase voice queries. Semantic coherence between keywords of a given spoken query is a result or measure of the keywords co-occurring together in a same web document, paragraph, or sentence. Such co-occurrence does not necessarily mean that keywords appear adjacent to each other or are otherwise similarly ordered within the same web document. Thus, if ASR hypothesis terms tend to co-occur frequently in a searched or indexed corpus of web documents, then the hypothesis is more likely to be correct. For example, consider two different hypotheses of a same utterance: (1) "tobacco road austin," and (2) "tobacco road author." The second hypothesis is the correct transcription of the voice query. Under n-gram language models, the first hypothesis is more probable. Notwithstanding, "tobacco road" co-occurs more often with "author" as compared to "Austin," and therefore, the second hypothesis can be indicated as more probable by the co-occurrence analysis.

Co-occurrence models are built targeted towards, or based on, co-occurrence of query terms to supplement n-gram statistical language models. This combination improves voice query recognition. At training time, co-occurrence statistics can be collected from web documents, and optionally from textual query logs. The co-occurrence models built can be used at run-time, either during recognition or as a post-processing step for rescoring the hypotheses. Different levels of co-occurrence can be identified with various scoring functions or steps. As a result, accuracy of the best hypothesis can provide lower Word Error Rates (WER).

Techniques disclosed herein that supplement automated speech recognition with a co-occurrence approach, can estimate exact co-occurrence scores for multiple terms in the ASR hypothesis directly using a search engine, unlike other approaches such as Latent Semantic Analysis (LSA), which constructs a low rank Singular Value Decomposition (SVD) based approximation for a term-document co-occurrence matrix and approximates the co-occurrence counts with a mixture of unigram probabilities (or topics). The LSA-based methods provide poor scalability for query data where the number of documents can easily exceed 100 million. Additionally, techniques disclosed herein can provide "slop based co-occurrence scores" where all the terms are required to be within a certain distance of each other. Such scores cannot be generated using document-term SVD approximations.

One embodiment includes a voice search manager that executes a voice search process or voice search system and accompanying automated speech recognition system. The voice search manager receives a spoken query. For example, a user speaks a search query captured by a wireless mobile device such as a cell phone. The voice search manager identifies, via an automated speech recognition process (or system implementing that process), multiple transcription hypotheses based on the spoken query. Each respective transcription hypothesis is a proposed textual representation of the spoken query, that is, a possibly correct transcription of the spoke query. Each respective transcription hypothesis includes a speech recognition score that indicates a probability of being a correct conversion of the spoken query to a text query. In other words, the speech recognition score is an indication of a level of confidence of accurate transcription.

The voice search manager evaluates a portion of the transcription hypotheses using a co-occurrence identification process. This co-occurrence identification process functions by identifying a frequency that proposed query terms, from each respective transcription hypothesis, co-occur within individual Web documents. The web documents can be from a corpus of web document collected from the Internet. The co-occurrence identification process assigns a co-occurrence score to each respective transcription hypothesis from the portion of the transcription hypotheses that are being evaluated by the co-occurrence identification process. The co-occurrence score represents or indicates a measure of semantic relation of the proposed query terms based on identified co-occurrence frequencies within the individual Web documents. The voice search manager then selects a best transcription hypothesis based on a combination of speech recognition scores and co-occurrence scores from the portion of the transcription hypotheses (from the subset of hypotheses). The best score is a highest combined score in that the best transcription hypothesis represents the hypothesis that is most likely the correct transcription. The voice search manager then receives search results, from an information retrieval system, based on a text query corresponding to the best transcription hypothesis. In other words, the voice search manager takes the transcribed keywords from the best transcription hypothesis, feeds these key words to a search engine as a text-based query, and then receives the corresponding search results to present via a user interface.

In other embodiments, the voice search manager can identify co-occurrences of the proposed query terms within a predetermined number of consecutive words in the individual Web documents, for example, within any group of about ten or twenty adjacent words in a single web document. Additionally, the frequency that proposed query terms co-occur within individual Web documents can include identifying non-sequential co-occurrences of the proposed query terms. Thus, the voice search manager is not limited to identifying exact phrases. The voice search manager can also evaluate a weighting of the speech recognition scores and the co-occurrence scores, and such weighting can be affected based on proposed query terms identified as co-occurring within a predetermined number of consecutive words within individual Web documents, or based on the a given hypothesis having over a predetermined number of proposed query terms (suggesting that the voice query is more of a phrase than a keyword search).

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a spoken query; identifying, via an automated speech recognition process, multiple transcription hypotheses based on the spoken query, each respective transcription hypothesis being a proposed textual representation of the spoken query, each respective transcription hypothesis including a speech recognition score that indicates a probability of being a correct conversion of the spoken query to a text query; evaluating a portion of the transcription hypotheses using a co-occurrence identification process, the co-occurrence identification process identifying a frequency that proposed query terms, from each respective transcription hypothesis, co-occur within individual Web documents from a corpus of web documents, the co-occurrence identification process assigning a co-occurrence score to each respective transcription hypothesis from the portion of the transcription hypotheses, the co-occurrence score representing a measure of semantic relation of the proposed query terms based on identified co-occurrence frequencies within the individual Web documents; selecting a best transcription hypothesis based on a combination of speech recognition scores and co-occurrence scores from the portion of the transcription hypotheses; and receiving search results, from an information retrieval system, based on a text query corresponding to the best transcription hypothesis. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting voice-enabled search applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods for voice-enabled searching. Techniques include a co-occurrence based approach that increases or improves accuracy of the 1-best hypothesis for non-phrase voice queries, as well as for phrased voice queries. A co-occurrence model is used in addition to a statistical natural language model to recognize spoken queries, such as spoken queries for searching a search engine.

Language models are a fundamental part of speech recognition. Language models are typically statistical models that can indicate a probability of any particular word sequence, prior to analyzing any spoken utterance. Thus, the statistical language model has a likelihood of saying a particular sequence of words. Such statistical language models are conventionally trained by collecting a huge corpus of phrases/utterances/word sequences (which can be domain specific).

There are various ways to collect such utterances. For example, one way is to record queries from various speakers until compiling a large database of queries. Another way is to access queries from a desktop search application that keeps a log of search queries. After collecting a relatively large corpus of utterances, the next step is to build an n-gram model. The n-gram model can make a Markov assumption (usually a low-order Markov assumption). A given word sequence can have a probability of occurring based on conditional probabilities, that is, a given word sequence can be decomposed or represented as being equal to the probability of the first word, multiplied by the probability of the second word—given the first word—and multiplied by the probability of the Nth word—given all preceding words in the given sequence. This word sequence probability can be modified by a Markov assumption. Although it is acknowledged that the N-th word in a given word sequence is indeed dependent on most or all of the words preceding the nth word, the Markov assumption is that the approximate probability of the Nth word is only dependent on the preceding K-words or N-words. Accordingly, an N-gram model represents the probability of a given word as being dependent on the last N minus one words. For example, a popular n-gram model is a tri-gram model, which considers the previous two words when determining the probability of a given word. This is the conventional approach to building a model for a voice search application.

Creating a model for a text search application has challenges. One primary challenge is acquiring a large corpus of text queries for training, especially for organizations that are not in the text search business. For example, search engine providers (such as Google, Microsoft, and Yahoo) collect enormous logs of search queries, that is, what users type into a search field of a search engine, but such search logs are typically kept as a closely-guarded secret. Thus, search logs are not readily accessible for creating a text search corpus. What is accessible, however, is web content in general. Documents, websites, publications and other content accessible over the Internet, can be acquired relatively easily. Thus, the system leverages potentially infinite document data that can be crawled from the web as a source to augment limited sources of query data. For query data that is available, such data can be used to tag word sequences in document data.

After acquiring a corpus of Web content, one option is to train a language model using conventional n-gram models based on the acquired Web content. Language modules can be trained on various corpora, such as unsupervised transcripts for spoken web queries, data collected from the web, street address database, directory assistance data, lists of common URLs, stock names, in-house data, and so forth. Such a model, however, would be less-effective at predicting probabilities of text queries. This is because users will not typically type the name or title of a particular Web document in a search box, but will instead type various keywords or short phrases that are not necessarily sequential within a given Web document. For example, a given user might be looking for a recipe for cooking swordfish made with a marinade that includes ginger and lemon. To find such a recipe, the given user might enter the query "swordfish recipe ginger lemon." This query, if considered as a phrase, is not a phrase that would be likely found in a given Web document. In other words, there is a very low probability that this exact sequence of words would appear in any given Web document. There is a significant possibility, however, that there exists Web documents that contain the four words (swordfish, recipe, ginger, lemon) co-occurring within those Web documents. In such documents, the query terms would most likely not occur adjacent to each other, but would nevertheless occur at some place within a single Web document. Thus, the ordering and sequential constraints of text queries are not as strong as those within a written document.

Figure 1:
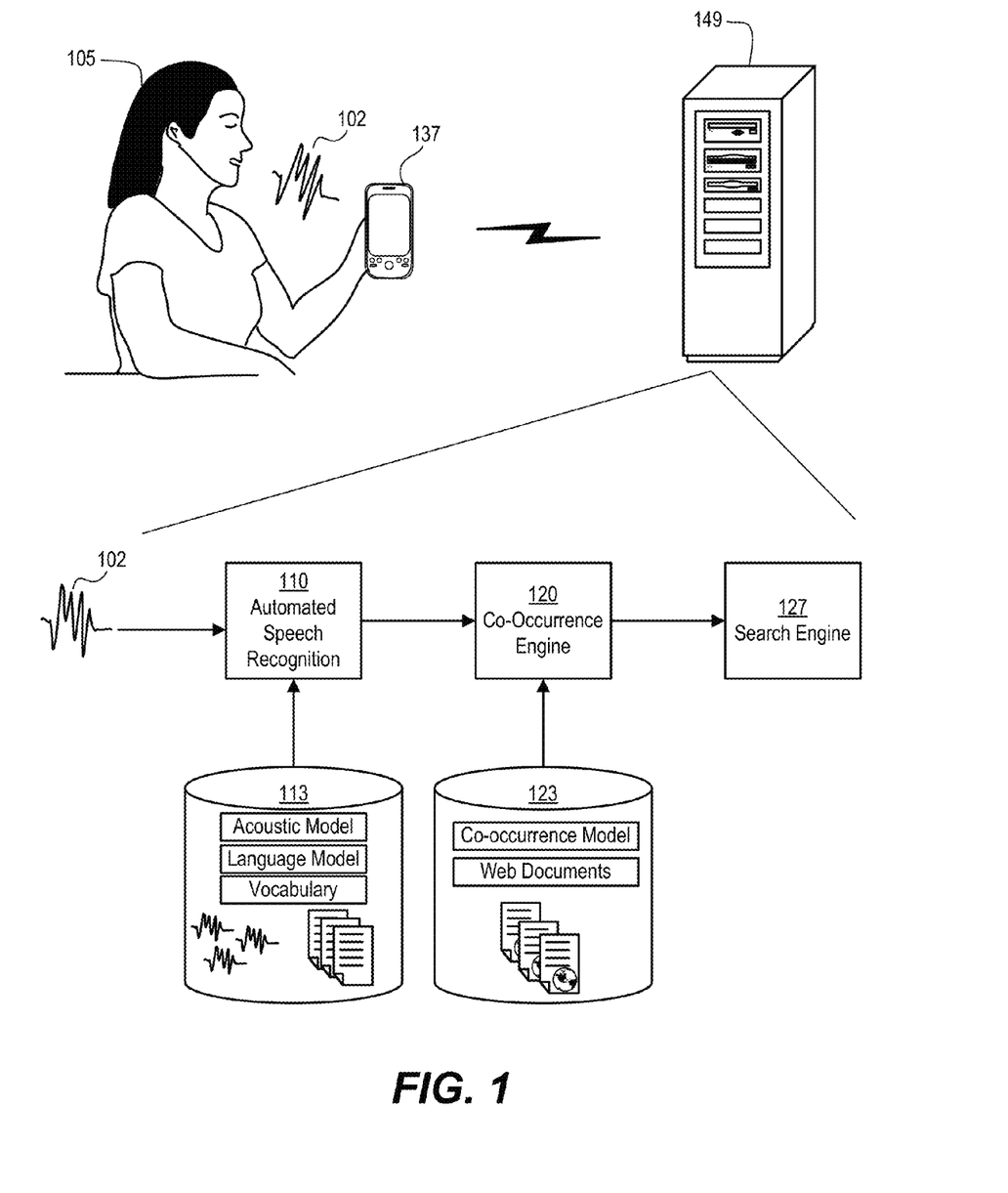
FIG. 1 is a block diagram of a system for voice-enabled search according to embodiments herein.

Referring now to FIG. 1, a block diagram illustrates a general architecture of the system and process. Input to the system is a voice query 102 or spoken utterance issued by a speaker 105, typically captured by a mobile device 137. This speaker could be a caller of a mobile telephone, operator of a desktop computer, driver operating a vehicle computer system, user of a wireless tablet computer, etc. In response to the mobile device 137 capturing the voice query, this voice query can be transmitted to a computer system 149, which can be a remote server or similar device. Alternatively, mobile device 137 can include functionality to recognize text and to function as computer system 149. It can be beneficial to transmit the recorded voice query 102 to a remote server that has better computational resources, because some mobile devices may not have the computation resources to store language models and execute a speech recognizer.

Now more specifically, the speech recognition process appears below computer system 149. The speech recognition process includes receiving voice query 102. This voice query can be converted to a waveform for analysis by automated speech recognition (ASR) process 110. The waveform is then analyzed by the ASR process. Such analysis can include using an acoustic model in conjunction with a phrased-based model (statistical language model), and one or more corpora of vocabulary (113). The language model that is essentially trained on sequential constraints, while the acoustic model operates on phonetic constraints from the waveform.

Such analysis can result in various amounts of best alternatives of what the spoken query might be. For example, there could be a thousand or one-hundred, or ten different alternatives (hypotheses) to consider. Each alternative can include an initial probability indication that can be applied to parallel or subsequent co-occurrence analysis for potential reordering of the initial hypotheses. Generating the alternatives can include using a decoder that produces a lattice or list of n-best list of choices. Each respective hypothesis includes a measure or indication of confidence, that is, a level of confidence of being correctly recognized.

After generating these hypotheses from the speech engine, these hypotheses are run through a co-occurrence engine 120 that returns scores representing (or based on) how many times respective terms of a hypothesis tend to occur together within a Web document. The co-occurrence engine 120 can include accessing a co-occurrence model based on analyzed web documents (123). This can be an offline collection from various data sources.

Co-occurrence analysis identifies a probability of words from each alternative hypothesis co-occurring within Web documents. A co-occurrence model identifies a probability of a group of words occurring within a single Web document. For example, such a co-occurrence model might identify more Web documents that contain words "Tiger," "Woods," and "crash" as compared to the words "Tiger" "Woods," and "cash." The co-occurrence model can generalize terms of word order and distance within a web document, as opposed to conventional sequential constraints from an n-gram model. The system can build a document index, or a table that identifies which words appeared in which documents. By analyzing the particular words in a given phrase, the system can identify an intersection of documents in which the particular words co-occur. Thus, the co-occurrence model identifies whether a group of words co-occur within a document, but not necessarily whether the group of words co-occur sequentially (exact phrase).

In one embodiment, co-occurrence models can be built targeted towards, or based on, co-occurrence of query terms to supplement n-gram statistical language models. At training time, co-occurrence statistics can be collected from web documents, and optionally from textual query logs. The co-occurrence models built can be used at run-time, either during recognition or as a post-processing step for rescoring the hypotheses. Different levels of co-occurrence can be identified with various scoring functions or steps.

In other embodiments, a given co-occurrence model can include a classing component. A classing or classification component enables use of information from terms identified as "similar." In other words, the system can determine that a particular term corresponds to a particular category or class of terms, and then use that determination to assist in evaluating hypotheses. For example, continuing with the "Tobacco Road author" example, with a classing component the system can recognize that "Tobacco Road" belongs to a class of books. By making this determination, the system can use the co-occurrence information between a specific class (such as a class labeled as: "BOOK") and author to assign a relatively higher score to the query even though data available to use might not have sufficient information about the specific example book ("Tobacco Road"). Such class information can be automatically derived using distributional similarity measures from the available data, as well as being extracted from other sources such as movie lists, book lists etc.

Class information functionality can be incorporated by accessing a database or index that includes classes as well as terms. The system can also access or use separate indexes. Alternatively, when searching for a particular term, the system can search for a given alternate terms in a corresponding class and retrieve co-occurrence data. By way of a non-limiting example, if the system searches for and fails to find any co-occurrence for the term "Tobacco Road" author, then the system can retrieve scores for "The Great Gatsby" (or other book) author, which also corresponds to a same class, such as the class labeled as "books."

In yet other embodiments, co-occurrence information from data can be augmented with word relatedness information derived from word ontologies and lexical databases such as Wordnet of Princeton University. Wordnet or other ontologies can provide—or permit access to specific data that can be used to provide—a score of how semantically related words are such as by providing categories of word as well as a distance in a hierarchical structure. Word relatedness scores, derived from such ontologies, can be merged with the co-occurrence score derived from other co-occurrence models.

The system can operate in a rescoring framework. After the automated speech recognizer has narrowed down the space to consider using an n-gram language model, the n-best choices can be rescored using co-occurrence analysis results. For example, typically there are at least two hypotheses to rescore. If the co-occurrence analysis determines that the words in the first hypothesis co-occur more frequently than the words in the second hypothesis, then this suggests that the first hypothesis is more likely correct, that is, a correct transcription of the spoken query.

As noted above, in alternative embodiments, in addition to rescoring hypotheses based on co-occurrence scores, rescoring can additionally be based on class/category. Rescoring can also be based on word relatedness information. Each of these additional bases for rescoring can be combined in various combinations, as well as being used separately.

In response to determining a hypothesis that is most likely correct, the system can then submit a corresponding query to a search engine 127 or other information retrieval system. The search engine 127 can then return search results, which can then be displayed to user 105 via mobile device 137.

Returning to the rescoring aspect, scores from the speech recognizer and from the co-occurrence engine can be merged or interpolated. For example, this can be a linear combination of the scores coming from the automated speech recognition engine, and the co-occurrence engine. The co-occurrence score can also be based on a threshold length of the phrase itself and/or distance between words in a Web document. The system can then combine these scores and take the highest score as the most likely output, as one way of rescoring.

Note that the initial decoding from the acoustic model and language model carries a measure of weight that should not be discarded based on the co-occurrence results. For example, although search queries can seem somewhat random, it is often the case that spoken keywords are not voiced in a completely random sequence, but some of the keywords can at least have some degree of natural language sequencing. Accordingly, results from the decoder based on sequential language models still carry significant weight in determining a correct voice query.

In one embodiment, the system takes a weighted average of scores from the language model and from the co-occurrence analysis. In some embodiments, if the spoken query is relatively short, then the system can favor the co-occurrence model, that is, weight the co-occurrence score relatively more than the language model score, or more than a baseline weight of co-occurrence scores. Correspondingly, if the query is relatively long, then the system can favor the language model over the co-occurrence model. This is because longer queries tend to be more similar to natural language, that is, more phrase like. Thus, for queries that appear more phrase-like, the system can give more weight to the phrased-based language model results.

Embodiments can take into account word neighborhoods, as a way of judging co-occurrence. For example, the system can give a particular co-occurrence instance a higher score if all the terms of the query appear within a window of a predetermined number of words from each other. For example, the system can assign a higher score if all the words of the query appear within ten words of each other in a given document. The co-occurrence engine can include a document level score as well as a window score as in words being within a 10-word window or grouping of each other.

The co-occurrence model itself, or Web document index itself, can represent or identify different types of co-occurrences. For example, one type of co-occurrence is counting a number of times a particular set of words appear together in a single document without regard to distance of the words from each other. Other types of co-occurrence take into account keyword distance from each other within the document. Thus, in some embodiments, having the query words within about ten words of each other in a given Web document can increase accuracy. By expanding the threshold to about twenty words, there may be some degradation of accuracy, but results may still be relatively accurate. By expanding the threshold, to one-hundred words or a thousand words or an entire document, however, the likelihood of a correct co-occurrence match decreases, because the keywords are less likely to be related to each other when spaced at such distances.

Note that there can be various types of co-occurrence constraints and scoring functions that capture different forms of semantic relationship between query terms.

Regarding co-occurrence semantics, the system can define a set of criteria to express co-occurrence relation between terms. For example, terms may be considered to co-occur if they appear in the same document or in the same local context. Various different query semantics can be defined to capture co-occurrence information at different levels. Disjunction of hypothesis terms (denoted OR), includes searching for documents containing at least one term of the hypothesis. Disjunction of conjunction of hypothesis terms (denoted ORn), includes searching for documents containing at least n terms of the hypothesis, with n being a parameter. Conjunction of hypothesis terms (denoted AND), includes searching for documents containing all the terms of the hypothesis. Near search of hypothesis terms (denoted NEARn), includes searching for documents containing all the terms of the hypothesis with a distance less than n terms between two hypothesis terms, with n being a parameter. Such terms are not required to be ordered in the result as in the hypothesis. The distance between two terms can be defined as the number of other terms from the document inserted between the two terms. Phrase search of hypothesis terms (denoted PHRASE), includes searching for the documents containing all the terms of the hypothesis as a phrase. The different hypothesis terms can be adjacent and ordered in the relevant documents. Also note that under AND, NEARn and PHRASE semantics, all the hypothesis terms can optionally be required to appear in the result to be considered as relevant. Stopwords can be filtered for all semantics, though an exception can be made for PHRASE in order to support exact phrase search. Generally, the hypothesis terms can appear in any order in the relevant documents except for PHRASE.

Co-occurrence scoring functions can be based on various estimates of the semantic relation between the different hypothesis terms in a corpus. A Term Frequency Inverse Document Frequency (TF-IDF) of a term appearing in a document in a corpus can be a statistical information retrieval measure used to evaluate how important a term is to a document in a corpus. Various models that extend TF-IDF can be used. A given TF-IDF scoring scheme can be used in a vector space model together with cosine similarity to measure the relevance of a document to a query or the similarity of two documents. Co-occurrence information can be captured about a hypothesis in a corpus by extending the TF-IDF score. Correct hypotheses will then receive higher co-occurrence scores.

The system can include different co-occurrence based scoring functions. Document frequency involves rescoring based on the document frequency of the hypothesis, that is, the number of documents matching a given hypothesis in the corpus. Term Frequency Inverse Document Frequency involves rescoring based on a sum of the TF-IDF of the hypothesis terms over a top number of matching documents. Some normalization of co-occurrence based scores can be optionally applied. Such normalization can be based on a number of documents matching at least one hypothesis term, or a minimum document frequency among all the hypothesis terms, etc.

Figure 5:
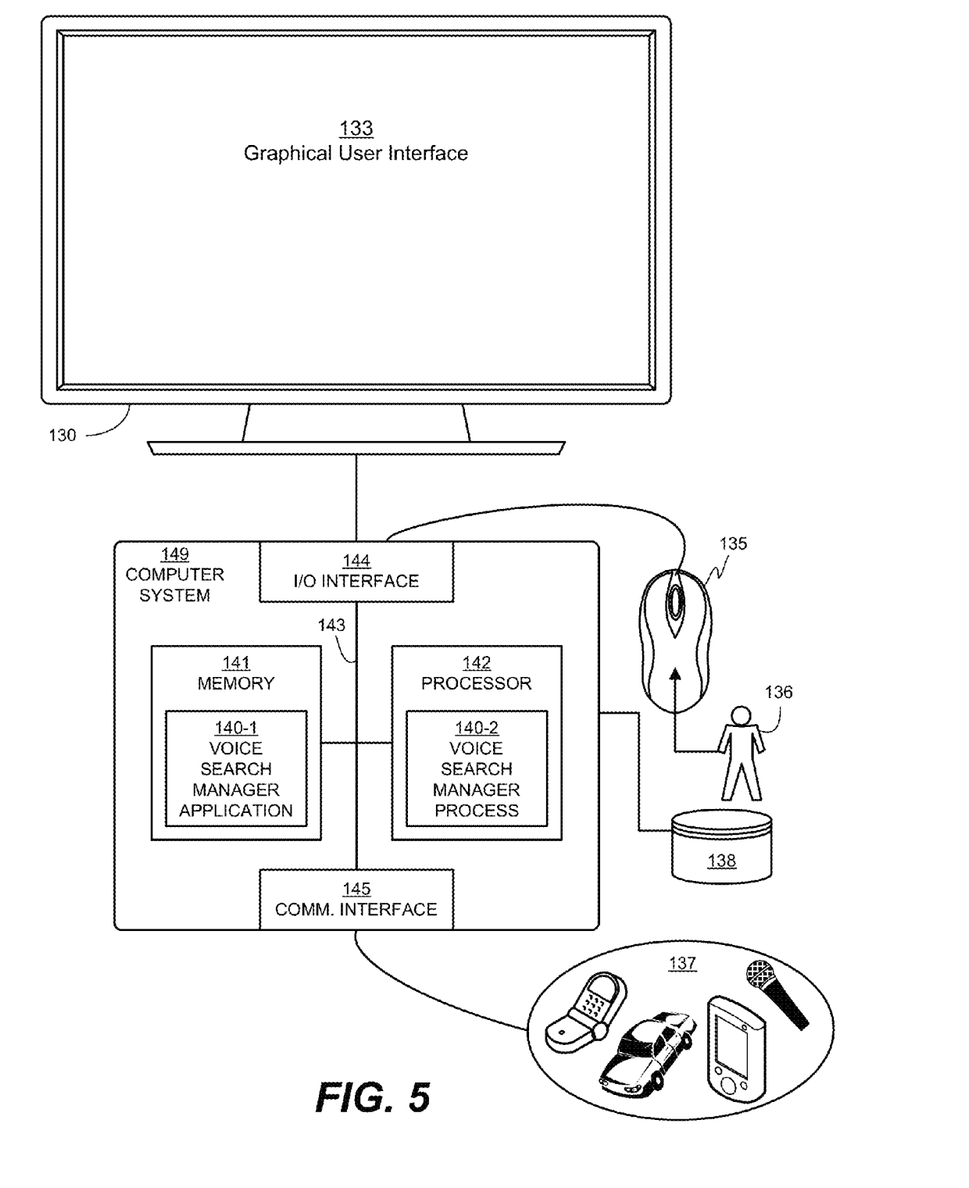
FIG. 5 is an example block diagram of a voice search manager operating in a computer/network environment according to embodiments herein.

FIG. 5 illustrates an example block diagram of a voice search manager 140 operating in a computer/network environment according to embodiments herein. In summary, FIG. 5 shows computer system 149 displaying a graphical user interface 133 that provides a voice search transcription interface. Computer system 149 can function as a client device such as a cell phone or other mobile device 137, or as a server that receives input from a given mobile device. Thus, computer system 149 can be—or connect to—a remote server for processing assistance. Computer system hardware aspects of FIG. 5 will be described in more detail following a description of the flow charts.

Functionality associated with voice search manager 140 will now be discussed via flowcharts and diagrams in FIG. 2 through FIG. 4. For purposes of the following discussion, the voice search manager 140 or other appropriate entity performs steps in the flowcharts.

Figure 2:
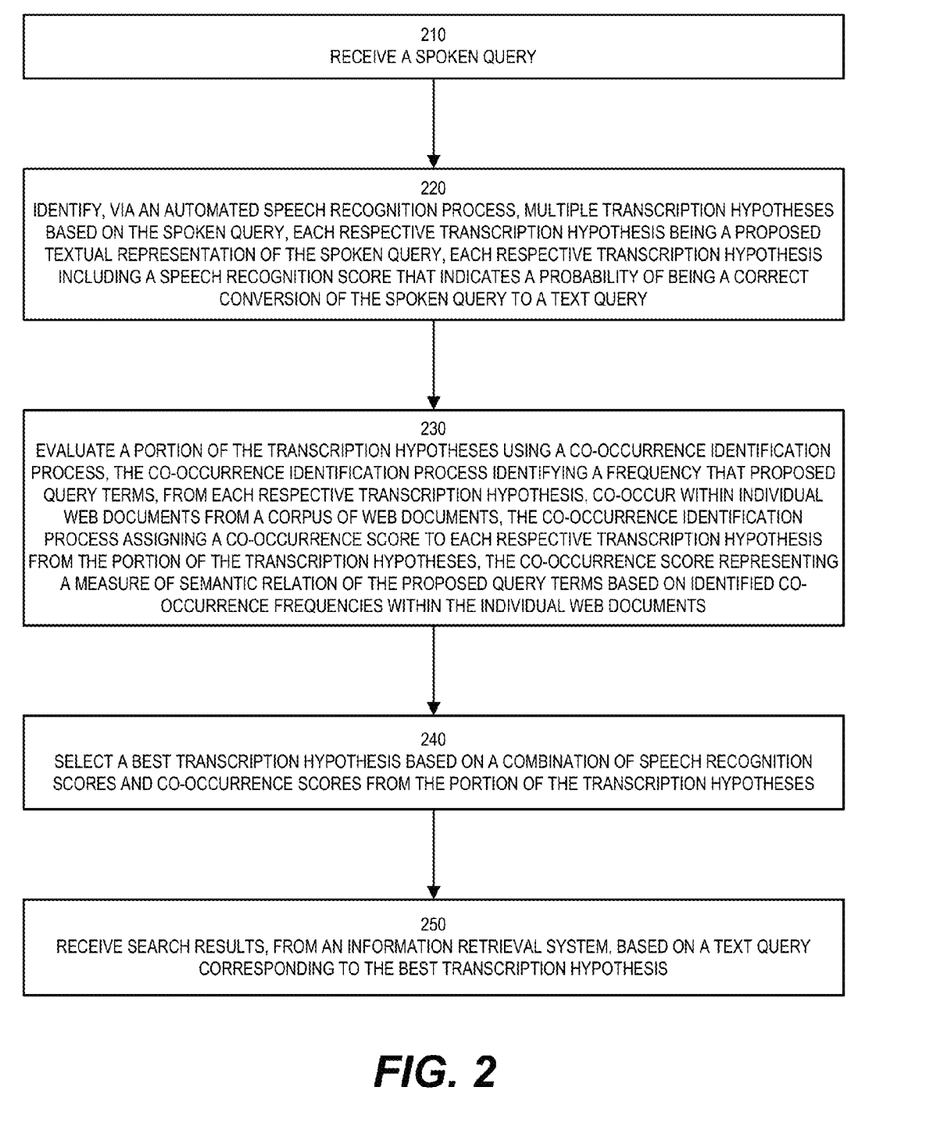
FIG. 2 is a flowchart illustrating an example of a process supporting a voice search manager according to embodiments herein.

Now describing embodiments more specifically, FIG. 2 is a flow chart illustrating embodiments disclosed herein. In step 210, the voice search manager 140 receives a spoken query. This can be received as a waveform, or as recorded audio, which is then converted into a waveform.

In step 220, the voice search manager identifies, via an automated speech recognition process, multiple transcription hypotheses based on the spoken query. Each respective transcription hypothesis is a proposed textual representation of the spoken query. Each respective transcription hypothesis includes a speech recognition score that indicates a probability of being a correct conversion of the spoken query to a text query. In other words, a speech recognizer converts a spoken query into multiple possible transcriptions, and can assign a level of confidence to each respective possible transcription. Transcription hypotheses can be any textual representation (character string, words, group of words) of the spoken query that is a potentially correct transcription of the spoken query, that is, a proposed or potential transcription (textual representation).

In step 230, the voice search manager evaluates a portion or subset of the transcription hypotheses using a co-occurrence identification process or engine. The co-occurrence identification process identifies a frequency that proposed query terms, from each respective transcription hypothesis, co-occur within individual web documents from a corpus of web documents. The co-occurrence identification process assigns a co-occurrence score to each respective transcription hypothesis from the portion of the transcription hypotheses. This co-occurrence score represents or indicates a measure of semantic relation of the proposed query terms based on identified co-occurrence frequencies within the individual web documents. For example, a given hypothesis can receive a higher co-occurrence score if that given hypothesis has query terms that appear more often together in web documents as compared to query terms from other hypotheses. Query terms refer to a word or phrase or group of words and numbers, etc.

Web document is a broad term that includes any content accessible over the Internet or other network connection. Web documents generally include any unit or item of web content having some measure of organization or structure. For example, web documents include web pages, websites, PDF files, word processing files, Blog posts, directory listings, image files (digital images), videos, Flash animation, news articles, online publications, social networking web pages, etc.

In step 240, the voice search manager selects a best transcription hypothesis based on a combination of speech recognition scores and co-occurrence scores from the portion of the transcription hypotheses. In other words, based on merged or interpolated scores, the voice search manager selects a hypothesis determined to be most likely correct.

In step 250, the voice search manager receives search results, from an information retrieval system (such as a search engine), based on a text query corresponding to the best transcription hypothesis.

Figure 3:
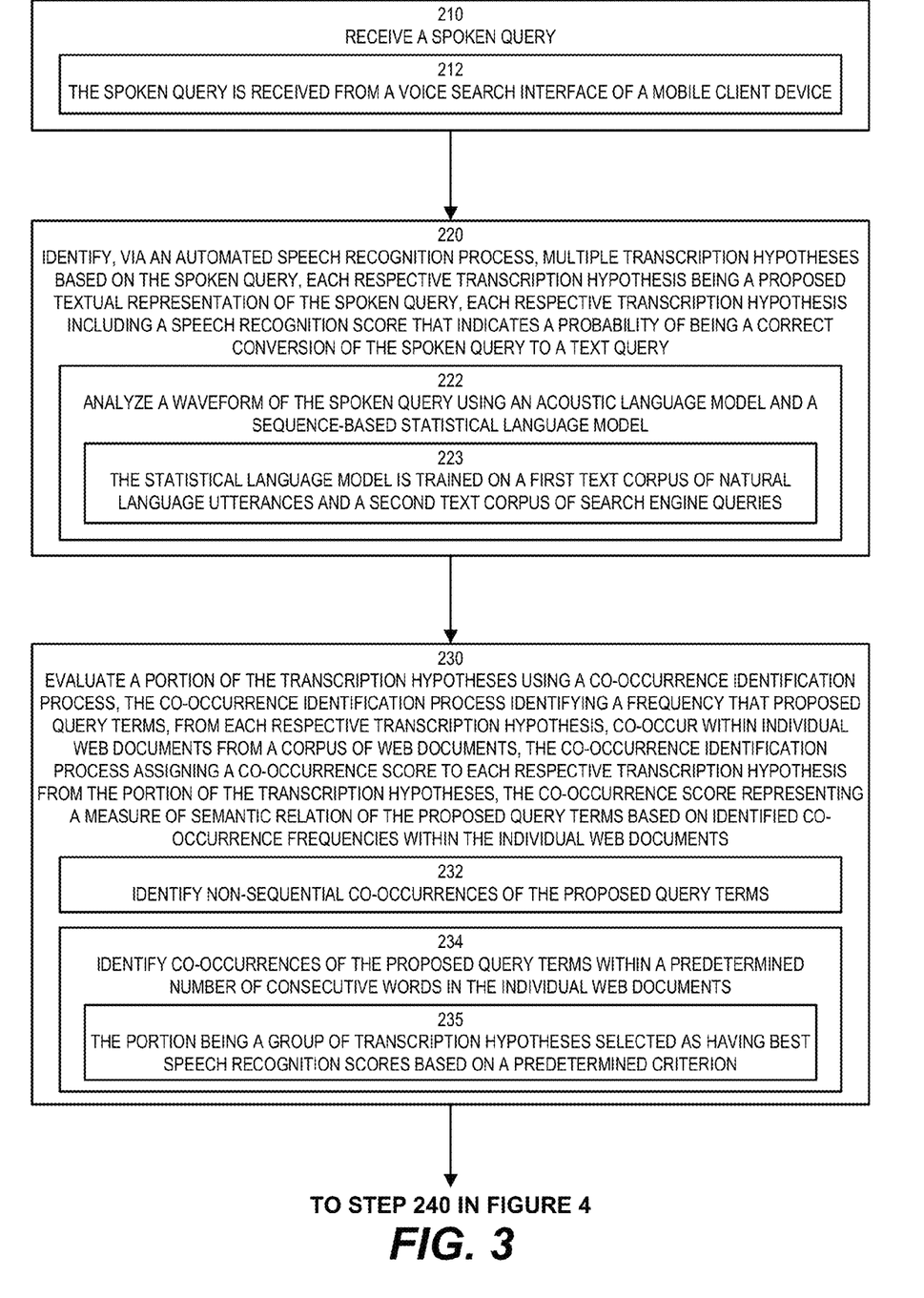
FIGS. 3-4 are a flowchart illustrating an example of a process supporting a voice search manager according to embodiments herein.
Figure 4:
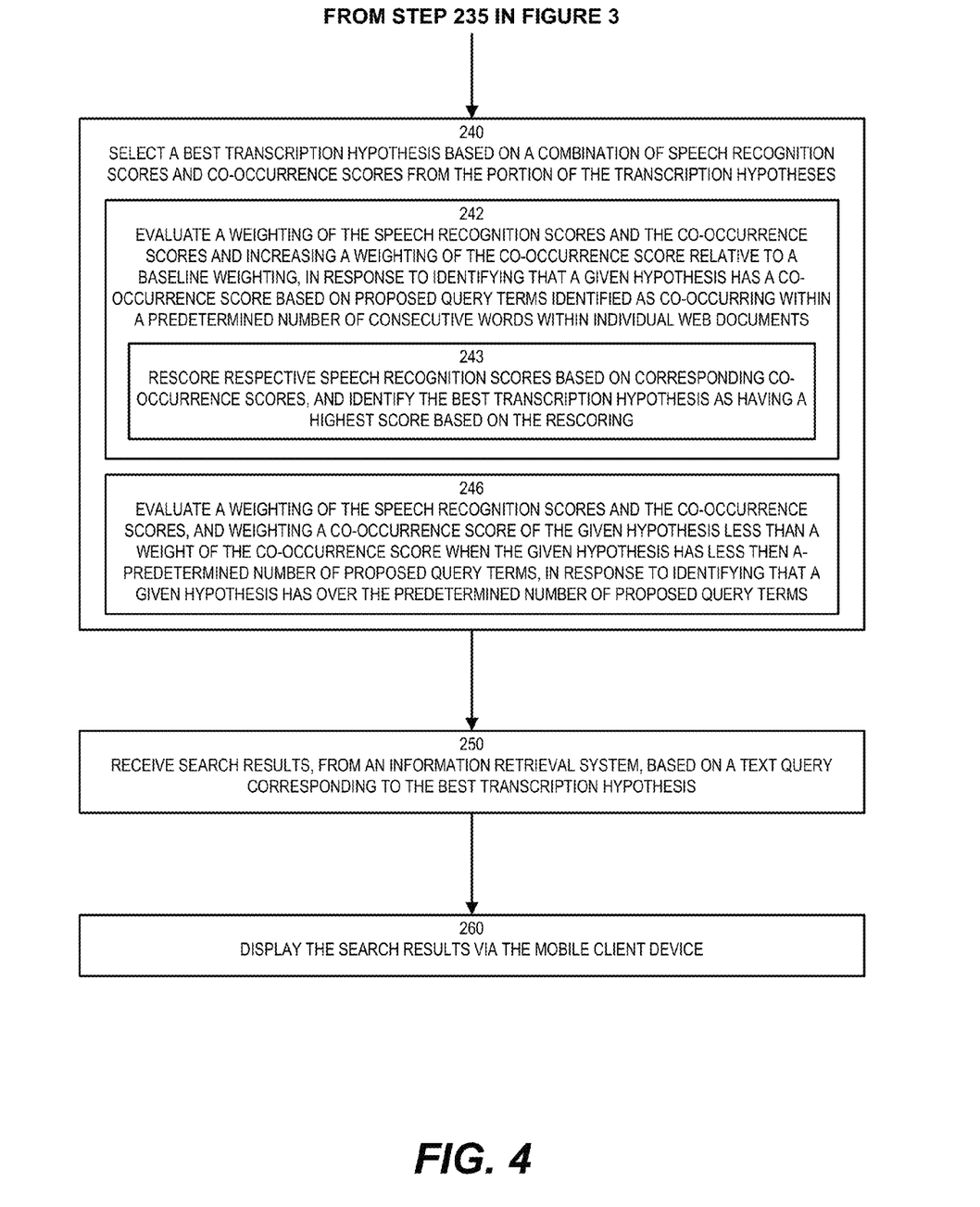

FIGS. 3-4 include a flow chart illustrating additional and/or alternative embodiments and optional functionality of the voice search manager 140 as disclosed herein.

In step 210, the voice search manager 140 receives a spoken query.

In step 212, the spoken query is received from a voice search interface of a mobile client device, such as from a mobile phone or tablet computer. Mobile client devices can include any end user device that is either portable or that wirelessly connects to a communication network. For example, mobile client devices include cell phones, personal digital assistants (PDAs), tablet computers, car navigation systems, laptop computers, portable music players, and so forth.

In step 220, the voice search manager identifies, via an automated speech recognition process, multiple transcription hypotheses based on the spoken query. Each respective transcription hypothesis is a proposed textual representation of the spoken query. Each respective transcription hypothesis includes a speech recognition score that indicates a probability of being a correct conversion of the spoken query to a text query.

In step 222, the voice search manager analyzes a waveform of the spoken query using an acoustic language model and a sequence-based statistical language model. In other words, phonetics of the voice query are analyzed in conjunction with analyzing phrase-based probabilities.

In step 223, the statistical language model is trained on a first text corpus of natural language utterances and a second text corpus of search engine queries. Training on available search engine queries can be helpful to improving accuracy of the automated speech recognizer, especially with analyzing spoken keyword queries.

In step 230, the voice search manager evaluates a portion or subset of the transcription hypotheses using a co-occurrence identification process or engine. The co-occurrence identification process identifies a frequency that proposed query terms, from each respective transcription hypothesis, co-occur within individual web documents from a corpus of web documents. The co-occurrence identification process assigns a co-occurrence score to each respective transcription hypothesis from the portion of the transcription hypotheses. This co-occurrence score represents or indicates a measure of semantic relation of the proposed query terms based on identified co-occurrence frequencies within the individual web documents.

In step 232, the voice search manager identifies non-sequential co-occurrences of the proposed query terms, that is, the co-occurrence engine does not require sequential instances of the query terms within web documents.

In step 234, the voice search manager identifies co-occurrences of the proposed query terms within a predetermined number of consecutive words in the individual web documents. For example, the co-occurrence only identifies the intersection of query terms that appear within a same group of word, such as within a same sentence, paragraph, group of ten or twenty words, etc.

In step 235, the portion is a group of transcription hypotheses selected as having best speech recognition scores based on a predetermined criterion. For example, the voice search manager selects the best 20 percent, or the top one-hundred hypotheses, or all hypotheses having a confidence level above a particular threshold.

In step 240, the voice search manager selects a best transcription hypothesis based on a combination of speech recognition scores and co-occurrence scores from the portion of the transcription hypotheses.

In step 242, the voice search manager evaluates a weighting of the speech recognition scores and the co-occurrence scores and, as a result, increases a weighting of a respective co-occurrence score relative to a baseline weighting. This can be in response to identifying that a given hypothesis has a co-occurrence score based on proposed query terms identified as co-occurring within a predetermined number of consecutive words within individual web documents. For example, if a co-occurrence happens within a group of ten words in a given document, then a corresponding score can be weighted more than if co-occurrence happened only within a document of several hundred words.

In step 243, the voice search manager rescores respective speech recognition scores based on corresponding co-occurrence scores, and identifies the best transcription hypothesis as having a highest score based on the rescoring. Thus, scores can be merged or linearly added to determine the best transcription hypothesis.

In step 246, the voice search manager evaluates a weighting of the speech recognition scores and the co-occurrence scores, and weights a co-occurrence score of the given hypothesis less than a weight of the co-occurrence score when the given hypothesis has less then a-predetermined number of proposed query terms as a response to identifying that a given hypothesis has over the predetermined number of proposed query terms. In other words, if a given hypotheses has a sufficient number of query terms (fifteen query terms versus three query terms), then the spoken query is probably closer to a natural language phrase than it is to a keyword search. In such a situation, the voice search manager can put more weight on the speech recognizer score.

In step 250, the voice search manager receives search results, from an information retrieval system, based on a text query corresponding to the best transcription hypothesis.

In step 260 the search results can then be displayed via the mobile client device.

In another embodiment, the voice search manager can perform additional steps, including evaluating the portion of the transcription hypotheses using a class identification process. The class identification process includes determining that a given query term, from a respective transcription hypothesis, corresponds to a specific class of terms or category of terms. For example, the voice search manager determines that the given query term can be classified as a book, an idiom, a person, a geographic location, a food item, a vendor, etc. The class identification process assigns a classification score to the given query term. Thus, the voice search manager can identify a measure or level of confidence of a given classification, which can be used for weighting when considering classification scores. In addition to selecting the best transcription hypothesis based on a combination of speech recognition scores and co-occurrence scores from the portion of the transcription hypotheses, the voice search manager can also base selection on classification scores and according to a particular weighting system.

Other embodiments include evaluating the portion of the transcription hypotheses using a word relatedness identification process. The word relatedness identification process including evaluating a given query term, from a respective transcription hypothesis, using a lexical database. One conventional database that can be used is Wordnet. The word relatedness identification process assigns a word relatedness score to the given query term. The word relatedness score indicates a measure of semantic relation of the given query term to other words. As with the classification scores, word relatedness scores can be used for selecting the best transcription hypothesis, in addition to considering the combination of speech recognition scores and co-occurrence scores.

Continuing with FIG. 5, the following discussion provides a basic embodiment indicating how to carry out functionality associated with the voice search manager 140 as discussed above. It should be noted, however, that the actual configuration for carrying out the voice search manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, tablet computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the voice search manager 140 of computer system 149 to communicate over a network and, if necessary, retrieve any data required to create views, process content, communicate with a user, etc. according to embodiments herein.

As shown, memory system 141 is encoded with voice search manager 140-1 that supports functionality as discussed above and as discussed further below. Voice search manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the voice search manager 140-1. Execution of the voice search manager 140-1 produces processing functionality in voice search manager process 140-2. In other words, the voice search manager process 140-2 represents one or more portions of the voice search manager 140 performing within or upon the processor 142 in the computer system 149.

It should be noted that, in addition to the voice search manager process 140-2 that carries out method operations as discussed herein, other embodiments herein include the voice search manager 140-1 itself (i.e., the un-executed or non-performing logic instructions and/or data). The voice search manager 140-1 may be stored on a non-transitory, tangible computer-readable storage medium including computer readable storage media such as floppy disk, hard disk, optical medium, etc. According to other embodiments, the voice search manager 140-1 can also be stored in a memory type system such as in firmware, read only memory (ROM), or, as in this example, as executable code within the memory system 141.

In addition to these embodiments, it should also be noted that other embodiments herein include the execution of the voice search manager 140-1 in processor 142 as the voice search manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A method comprising:
receiving a spoken query;
identifying, via an automated speech recognition process, a plurality of transcription hypotheses based on the spoken query, each respective transcription hypothesis having a speech recognition score;
evaluating the plurality of transcription hypotheses using a co-occurrence identification process, the co-occurrence identification process comprising:
identifying a frequency that proposed query terms, from each respective transcription hypothesis, co-occur based on a corpus of documents;
assigning a co-occurrence score to each respective transcription hypothesis;
evaluating a weighting of the speech recognition score of each respective transcription hypothesis and a weighting of the co-occurrence score of each respective transcription hypothesis;
increasing a weighting of a co-occurrence score of a given transcription hypothesis of the plurality of transcription hypotheses to be greater than a weighting of a speech recognition score of the given transcription hypothesis of the plurality of transcription hypotheses when proposed query terms from the given transcription hypothesis are more than a threshold phrase length; and
selecting a best transcription hypothesis based on at least the weighting of the speech recognition score of each respective transcription hypothesis and the weighting of the co-occurrence score of each respective transcription hypothesis;
generating a text query corresponding to the best transcription hypothesis; and
receiving, from an information retrieval system, search results based on the text query corresponding to the best transcription hypothesis.

2. The method of claim 1, wherein the co-occurrence score of the given transcription hypothesis represents a measure of semantic relation of the proposed query terms based on identified co-occurrence frequencies including identifying non-sequential co-occurrences of the proposed query terms within the documents in the corpus.

3. The method of claim 2, further comprising:
selecting the best transcription hypothesis based on a combination of speech recognition scores and co-occurrence scores from the plurality of transcription hypotheses.

4. The method of claim 1, wherein identifying the frequency that proposed query terms co-occur based on the corpus of documents includes identifying co-occurrences of the proposed query terms within a predetermined number of consecutive words in an individual document of the corpus of documents.

5. The method of claim 1, wherein evaluating the plurality of transcription hypotheses using the co-occurrence identification process includes the plurality being a group of transcription hypotheses selected as having best speech recognition scores based on a predetermined criterion.

6. The method of claim 1, comprising:
increasing the weighting of the co-occurrence score of the given transcription hypothesis relative to a baseline weighting in response to identifying that the proposed query terms from the given transcription hypothesis co-occur within a predetermined number of consecutive words within an individual document of the corpus of documents.

7. The method of claim 1, comprising:
rescoring the speech recognition score of each respective transcription hypothesis based on the co-occurrence score of the respective transcription hypothesis; and
identifying the best transcription hypothesis as having a highest score based on the rescoring.

8. The method of claim 1, wherein identifying the plurality of transcription hypotheses via the automated speech recognition process includes analyzing a waveform of the spoken query using an acoustic language model and a sequence-based statistical language model.

9. The method of claim 8, wherein the statistical language model is trained on a first text corpus of natural language utterances and a second text corpus of search engine queries.

10. The method of claim 1, wherein the spoken query is received from a voice search interface of a mobile client device.

11. The method of claim 1, further comprising:
evaluating the plurality of transcription hypotheses using a class identification process, the class identification process including determining that a given query term, from a respective transcription hypothesis, corresponds to a specific class of terms, the class identification process assigning a classification score to the given query term,
wherein selecting the best transcription hypothesis is further based on classification scores.

12. The method of claim 1, further comprising:
evaluating the plurality of transcription hypotheses using a word relatedness identification process, the word relatedness identification process including evaluating a given query term, from a respective transcription hypothesis, using a lexical database, the word relatedness identification process assigning a word relatedness score to the given query term, the word relatedness score indicating a measure of semantic relation of the given query term to other words,
wherein selecting the best transcription hypothesis is further based on word relatedness scores.

13. A system comprising:
a processor; and
non-transitory memory storing executable instructions that, when executed by the processor, cause the system to perform:

receiving a spoken query;
identifying, via an automated speech recognition process, a plurality of transcription hypotheses based on the spoken query, each respective transcription hypothesis having a speech recognition score;
evaluating the plurality of transcription hypotheses using a co-occurrence identification process, the co-occurrence identification process comprising:
identifying a frequency that proposed query terms, from each respective transcription hypothesis, co-occur based on a corpus of documents;
assigning a co-occurrence score to each respective transcription hypothesis;
evaluating a weighting of the speech recognition score of each respective transcription hypothesis and a weighting of the co-occurrence score of each respective transcription hypothesis;
increasing a weighting of a co-occurrence score of a given transcription hypothesis of the plurality of transcription hypotheses to be greater than a weighting of a speech recognition score of the given transcription hypothesis of the plurality of transcription hypotheses when proposed query terms from the given transcription hypothesis are more than a threshold phrase length; and
selecting a best transcription hypothesis based on at least the weighting of the speech recognition score of each respective transcription hypothesis and the weighting of the co-occurrence score of each respective transcription hypothesis;
generating a text query corresponding to the best transcription hypothesis; and
receiving, from an information retrieval system, search results based on the text query corresponding to the best transcription hypothesis.

14. One or more non-transitory computer-readable media storing executable instructions that, when executed by a processor, cause a system to:
receive a spoken query;
identify, via an automated speech recognition process, a plurality of transcription hypotheses based on the spoken query, each respective transcription hypothesis having a speech recognition score;
evaluate the plurality of transcription hypotheses using a co-occurrence identification process, the co-occurrence identification process comprising:
identifying a frequency that proposed query terms, from each respective transcription hypothesis, co-occur based on a corpus of documents;
assigning a co-occurrence score to each respective transcription hypothesis;
evaluating a weighting of the speech recognition score of each respective transcription hypothesis and a weighting of the co-occurrence score of each respective transcription hypothesis;
increasing a weighting of a co-occurrence score of a given transcription hypothesis of the plurality of transcription hypotheses to be greater than a weighting of a speech recognition score of the given transcription hypothesis of the plurality of transcription hypotheses when proposed query terms from the given transcription hypothesis are more than a threshold phrase length; and
selecting a best transcription hypothesis based on at least the weighting of the speech recognition score of each respective transcription hypothesis and the weighting of the co-occurrence score of each respective transcription hypothesis;
generate a text query corresponding to the best transcription hypothesis; and
receive, from an information retrieval system, search results based on the text query corresponding to the best transcription hypothesis.

15. The method of claim 1, comprising:
building a document index that identifies which words appear in which documents of the corpus of documents; and
analyzing the document index using the proposed query terms from the given transcription hypothesis to identify a subset of documents of the corpus of documents in which the proposed query terms co-occur.

16. The method of claim 1, wherein selecting the best transcription hypothesis is further based on the speech recognition score of each respective transcription hypothesis and the co-occurrence score of each respective transcription hypothesis.

17. The method of claim 1, wherein identifying, via the automated speech recognition process, the plurality of transcription hypotheses based on the spoken query comprises analyzing phrase-based possibilities of the spoken query.

18. The method of claim 1, comprising:
selecting a subset of the plurality of transcription hypotheses based on the speech recognition score of each respective transcription hypothesis of the subset being above a threshold score; and
evaluating the subset of the plurality of transcription hypotheses using the co-occurrence identification process.

19. The system of claim 13, wherein identifying the frequency that proposed query terms co-occur based on the corpus of documents includes identifying co-occurrences of the proposed query terms within a predetermined number of consecutive words in an individual document of the corpus of documents.

20. The system of claim 13, wherein the executable instructions, when executed by the processor, cause the system to perform:
increasing the weighting of the co-occurrence score of the given transcription hypothesis relative to a baseline weighting in response to identifying that the proposed query terms from the given transcription hypothesis co-occur within a predetermined number of consecutive words within an individual document of the corpus of documents.

21. The system of claim 13, wherein the executable instructions, when executed by the processor, cause the system to perform:
evaluating the plurality of transcription hypotheses using a class identification process, the class identification process including determining that a given query term, from a respective transcription hypothesis, corresponds to a specific class of terms, the class identification process assigning a classification score to the given query term, wherein selecting the best transcription hypothesis is further based on classification scores.

22. The one or more non-transitory computer-readable media of claim 14, wherein identifying the frequency that proposed query terms co-occur based on the corpus of documents includes identifying co-occurrences of the proposed query terms within a predetermined number of consecutive words in an individual document of the corpus of documents.

23. The one or more non-transitory computer-readable media of claim 14, wherein the executable instructions, when executed by the processor, cause the system to:
    increase the weighting of the co-occurrence score of the given transcription hypothesis relative to a baseline weighting in response to identifying that the proposed query terms from the given transcription hypothesis co-occur within a predetermined number of consecutive words within an individual document of the corpus of documents.

24. The one or more non-transitory computer-readable media of claim 14, wherein the executable instructions, when executed by the processor, cause the system to:
    evaluate the plurality of transcription hypotheses using a class identification process, the class identification process including determining that a given query term, from a respective transcription hypothesis, corresponds to a specific class of terms, the class identification process assigning a classification score to the given query term, wherein selecting the best transcription hypothesis is further based on classification scores.

\* \* \* \* \*